United States Patent [19]
Perkins, III et al.

[11] Patent Number: 6,073,114
[45] Date of Patent: *Jun. 6, 2000

[54] METHOD FOR TRACKING TIMBER

[75] Inventors: Frank N. Perkins, III, Huntsville, Ala.; Frank M. Riley, Jr., Perry; J. Blake Sullivan, Americus, both of Ga.; Charles R. Rutledge, Madison, Ala.; Patricia G. Rutledge, Madison, Ala.; Blake D. Reid, Madison, Ala.; Karen E. Albritton, Madison, Ala.; Reuel Dulaney, Huntsville, Ala.; Andrew G. Bailey, Madison, Ala.

[73] Assignee: Talent Technology, Inc., Huntsville, Ala.

[ * ] Notice: This patent issued on a continued prosecution application filed under 37 CFR 1.53(d), and is subject to the twenty year patent term provisions of 35 U.S.C. 154(a)(2).

[21] Appl. No.: 08/561,846

[22] Filed: Nov. 22, 1995

[51] Int. Cl.$^7$ .................................................... G06F 17/60
[52] U.S. Cl. ............................ 705/28; 235/375; 235/384; 235/385
[58] Field of Search ............................... 395/228; 705/28; 235/375, 384, 385

[56] References Cited

U.S. PATENT DOCUMENTS

| 5,204,819 | 4/1993 | Ryan | 364/465 |
| 5,515,303 | 5/1996 | Cargin, Jr. et al. | 364/708.1 |

OTHER PUBLICATIONS

"Radio frequency communication systems boost shipping efficiency Mobile computer terminals linked to computers via RF can up efficiency at paper mills"; Pulp & Paper; p. 100, Oct. 1087.

"Data on the Go"; High TEchnology Business; v9, n5, pp. 16–28, May 1989.

Craig Zarley, "PC's Give Forestry–Products Firm a Sharp Market Edge; Micros Help", PC Week, v 2, pp. 57–59, Oct. 1985.

*Primary Examiner*—Gail O. Hayes
*Assistant Examiner*—William N. Hughet
*Attorney, Agent, or Firm*—Lanier Ford Shaver & Payne P.C.; Frank M. Caprio; Russell L. Sandidge

[57] ABSTRACT

The invention relates to an improved method for accounting for, and keeping track of, commodities which are gathered or harvested in one location and thereafter transported for delivery to another location. While the invention is applicable for use with a variety of commodities, the embodiment discussed concerns timber. It provides for a paperless process which accommodates the use by, and inputs from, various persons responsible for different steps in the process. It can be initiated by the timber owner and thereafter allows for the accumulation and recordation of pertinent information by other persons responsible for the various steps of timber identification, harvesting and delivery, such as the forester, loader, timber cutting crew chief, transporter, and destination purchaser. The method provides security, accountability, data entry, data retrieval, and reporting, with respect to commodity harvesting, transport, delivery, and receipt. Use of the method is not limited to the timber industry, but is applicable to the tracking of any commodity item.

11 Claims, 3 Drawing Sheets

The Tree Trakker Process

Figure 1. Trakker Box
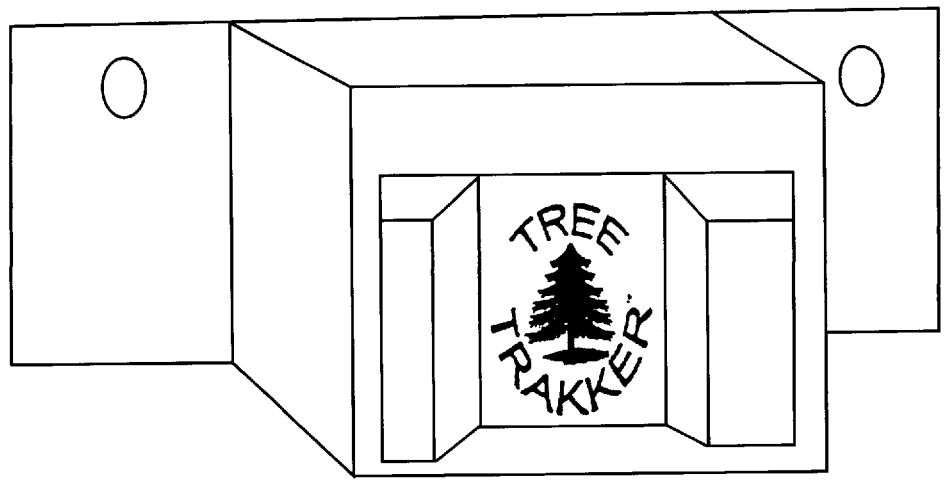
Figure 2. Trakker Box Installation to Timber Trailer
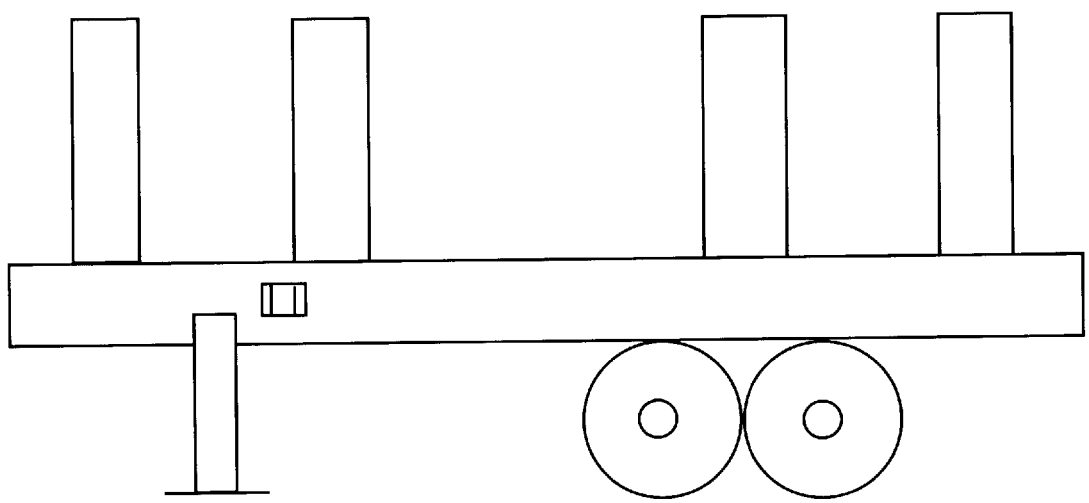
Figure 3. Tree Trakker Wand
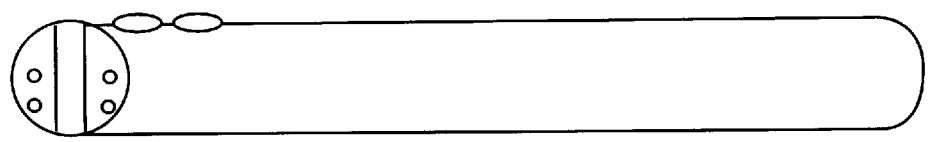

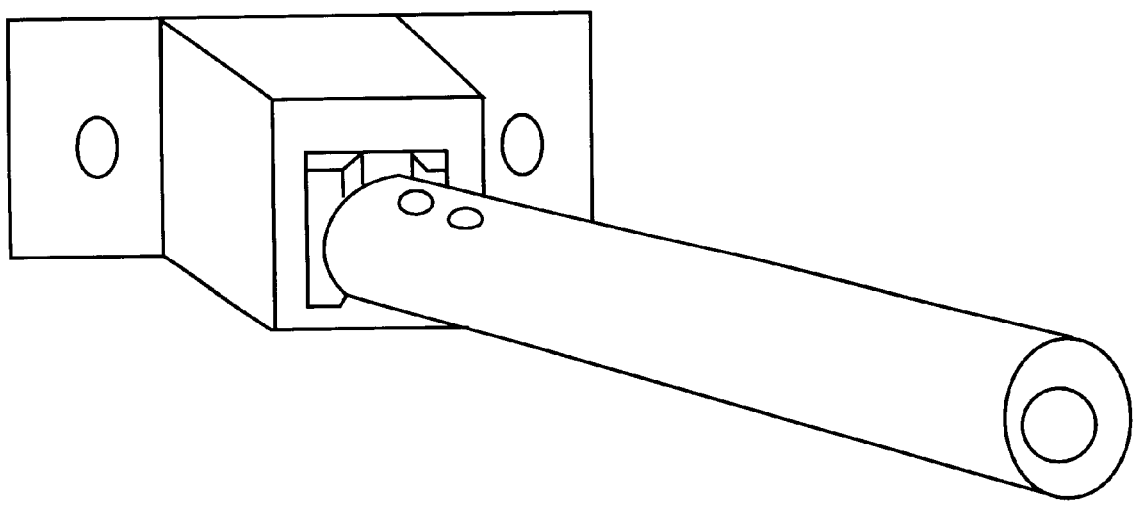
Figure 4. Trakker Touch Interface

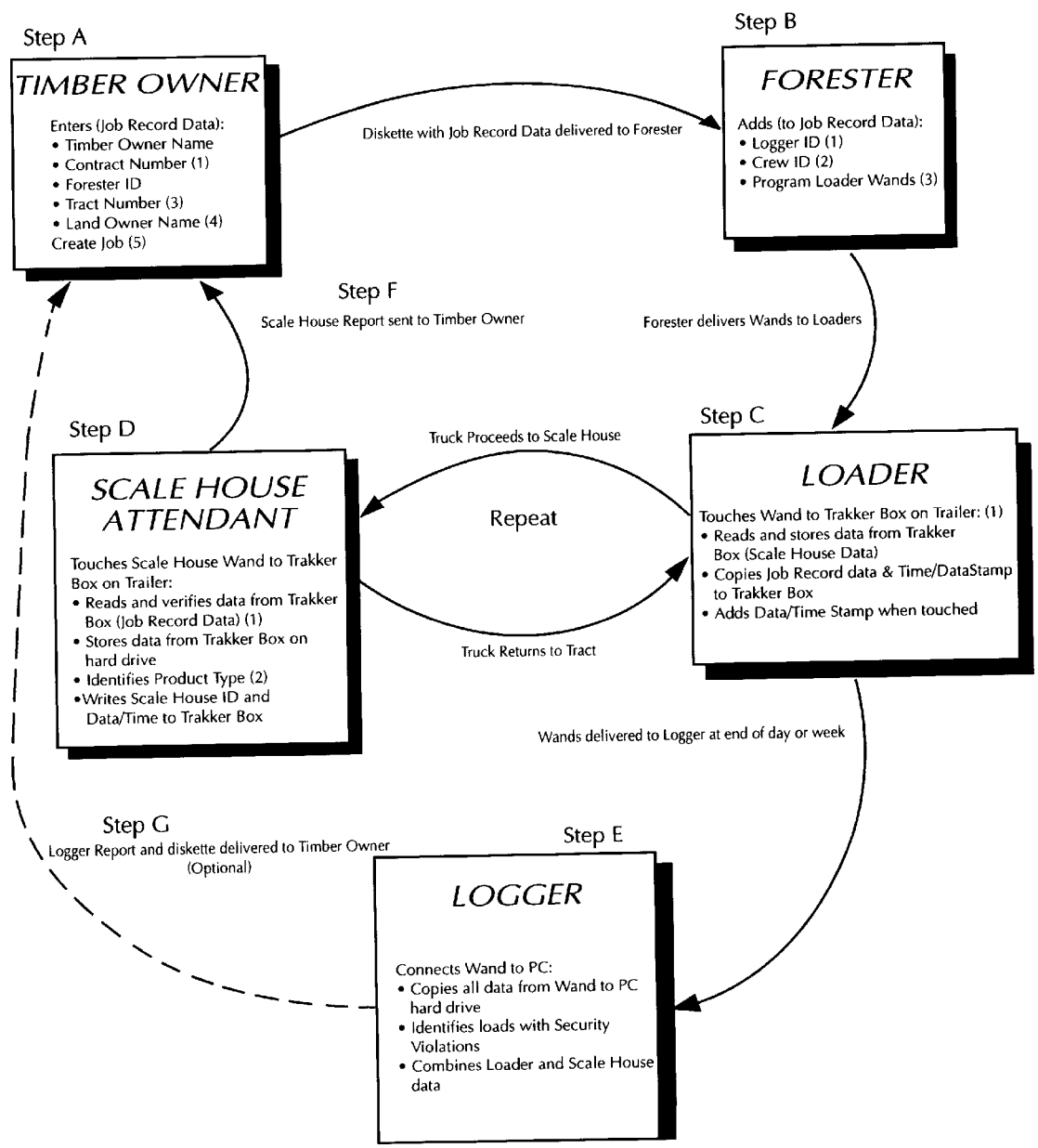
Figure 5. The Tree Trakker Process
*The Tree Trakker Process*

METHOD FOR TRACKING TIMBER

BACKGROUND OF THE INVENTION

Timber is similar to many other commodity items. Once removed from the stump and transported, individual logs are virtually indistinguishable from other logs. One market may value these logs more than another market. It is known in the industry that cut timber is stolen or diverted and sold for the highest value.

There is often little or no accounting of the timber from the time it is cut to the time it reaches its planned destination, such as a paper mill. During this time frame, many inaccurate recordings and other mistakes are made, both intentional and unintentional. Existing methods for keeping track of timber include the use of paper tickets, bar coded paper and cards, credit cards, log entries, and other paper methods which are replete with the possibility of unintentional mistakes, and susceptible to intentional misreporting, subterfuge, and theft.

The consumer ultimately pays the price of lost or stolen timber in the form of higher prices for all forest products such as paper, packaging, and lumber. It is an object of this invention to decrease the amount of cut timber which is lost, stolen, or otherwise goes unaccounted for.

Timber Value Varies By Timber Type

A wide variety of timber types and species exist in the United States. The climate, soils, moisture, and man's influence all play a part in determining the type of timber growing in any one area. Specific types of timber are used to make different wood products. Pines are used for lumber, pulpwood, plywood, telephone poles, piling, cabin logs, turpentine, and other chemical extraction. Upland Hardwood Forest trees are used for lumber, pulpwood, and veneer. As pulpwood, hardwood sold is less valuable than pine, but used as sawlogs or veneer logs, the hardwood is often more valuable than the pine. Swamp Hardwood Forest trees are used for sawlogs or veneer logs. The value of the timber standing on the stump is directly related to the value of the finished product. For example, wood suitable for fine furniture commands a better price than wood which is to be chipped up and made into paper. Some products dictate their own prices, such as telephone poles which must meet certain height and taper conditions. Growing these poles requires a longer growth cycle than found with pulpwood and sawlogs. Many tree with pole potential are cut early and used as sawlogs, causing a shortage of poles, therefore increasing the market price for the remaining poles. It is an object to the invention to consistently and accurately keep track of the type of timber harvested from a particular plot of land and thereafter delivered to a destination.

Timber Volume and Weight Measurement

Another factor affecting the value of timber is the measurement of the cut timber. Pulpwood and Sawlogs can be purchased by either weight or volume. Poles and Veneer are normally purchased by volume and each log is scaled individually. Historically, wood of all types has been sold based on volume. In recent years this practice has changed to sales being made based on weight (priced per ton). Currently, many states require wood to be purchased only on a per ton basis. It is an object of the invention to consistently and accurately account for the timber volume and weight measurements from the time the timber is cut to the time it is received at its destination.

Generic Discussion of the Chain of Responsibility in Timber Harvesting

The method of the invention establishes specific responsibilities for each individual involved in the process of harvesting, transporting, delivering, and receiving the timber. As an example of what is a typical case in the industry, these individuals will include a timber owner, forester, logger, crew chief, truck driver, and Scale House Operator. Each of these individuals' responsibilities are unique and specific. The timber owner, or his agent, is the person who owns the rights to timber on a particular tract of land. The forester is the person who will negotiate a contract for the terms of sale of timber with a logger. The logger will assign the task of cutting a tract of timber to a particular crew chief. The crew chief will be responsible, at the site of the timber, for its cutting and loading onto a vehicle, and for its delivery to a particular destination by a driver. The Scale House Operator is employed at the destination, usually by the entity purchasing the timber. The Scale House Operator is typically responsible for accepting delivery of a load of timber from the driver, and for accounting for the load with respect to load size, timber type, seller, date and time, and other information.

Accounting

Currently, the two principal methods of accounting control include using a paper system or a credit card system.

With a paper system, the logger either writes down or "tells" the crew chief the pertinent information about the loads he has delivered. The crew chief fills out a numbered form (in carbonless triplicate) and gives one copy to the truck driver to provide to the mill. The truck driver then gives the form to the Scale House Operator at the mill. The Scale House Operator then enters the information from the form. Problems arise when the logger or crew chief (intentionally or unintentionally) provide inaccurate information to the mill. Also, the truck driver may "lose" paper tickets, and the Scale House Operator has the responsibility to accurately enter the information at the mill, which may not be done due to error or an intentional act.

With a credit card system, the mill provides the logger with multiple cards for each tract from which he cuts timber. These cards are coded with a magnetic strip or bar code. Each card has a unique number identifying what tract the timber came from, along with other information. The truck driver gives the card to the Scale House Operator. The Scale House Operator reads the card with the computer. The computer uses the unique number to "look up" the appropriate data file which has all the pertinent information. The logger has the responsibility to provide the proper card to the truck driver. The truck driver, who may have many different cards for different tracts, may inadvertently give the wrong card to the Scale House Operator, or he may do so intentionally. By using the credit card system, the opportunity exists for inaccurate information to be entered either using the wrong card, or inputting the wrong information, such as recording that the timber came from one tract, when it actually came from another tract.

In addition to these two methods, in other existing methods, the logger essentially "tells" the crew chief the contract number, the landowner, the tract number, and other pertinent information. The crew chief then "tells" the truck driver this information, the truck driver then "tells" it to the Scale House Operator. The Scale House Operator then must account for the information as stated. Anyone involved in this process could provide inaccurate information completely based on trust. These methods place reliance on lower level personnel, such as the logging crew chief, truck driver, or Scale House Operator. These employees often are not capable of handling this responsibility in an accurate manner. Workers are not necessarily educated. Many crew bosses do not have higher-level education. Some are illiterate. Some truck drivers are illiterate. The Scale House Operator is typically the highest educated personnel in the process. It is rare to find any personnel with much education past high school.

It is an objective of this invention is to eliminate the many ongoing accounting and security problems that exist in the harvesting and delivery of commodities, such as timber. There are several timberland security risks. Until the wood is scaled, all volumes are estimates. Assets are geographically dispersed, difficult to lock up, and rarely supervised. Due to downsizing, many contractors do much of the work. There are many markets and multiple products. The people who cut and haul the wood are normally not the owner's employees, or family members, and therefore may not be trustworthy.

Another reason why improved security is necessary is that employee dishonesty will rise to the highest level tolerated by management. There are several opportunities and motives for fraud to occur. Despite control measures, mills often purchase stolen wood. If the wood is delivered under a valid contract by a current vendor, most mills accept the wood as coming from the tract specified in the contract. Therefore, the burden is placed on the logger to ensure the wood came from the tract identified in the paper records. When he signs the contract, he warrants that he has free and clear title to the timber he is delivering. Once the wood is delivered and placed in a pile at the destination, such as a sawmill, or pulpmill, its identity is lost. Tracing its origin is rarely done because of expense and effort.

Three security problems include: (1) petty theft, whereas the truck driver steals an occasional load, (2) mistakes, due to the lack of workers' education and absence of control, and (3) serious theft, which involves intentional stealing. It is another object of the invention to eliminate the first two problems, and to increase the mill's ability to control the third problem, (serious theft).

There are several objects of this invention, including:

reducing the risk of, and incidences of, timber theft.

reducing the paperwork involved in tracking commodities, such as timber.

reducing the amount of paperwork errors.

reducing the amount of required accounting staff.

increasing efficiency in the process of tracking commodities, such as timber.

providing greater accuracy in reports of commodity loads, such as timber loads.

providing greater accountability for the acts of those responsible for timber harvesting.

providing increased profits to land owners and commodity owners.

reducing temptations for theft.

DETAILED DESCRIPTION OF THE DRAWINGS

FIG. 1 is a view of the front of the Trakker Box.

FIG. 2 indicates placement of the Trakker Box on a typical timber trailer.

FIG. 3 is a side view of the Tree Trakker Wand.

FIG. 4 indicates the positioning of the Wand to the Box for data transfer.

FIG. 5 is a process diagram indicating the sequence of steps of the invention.

DESCRIPTION OF THE INVENTION

The method of the invention establishes specific responsibilities for each individual involved in the process of harvesting, transporting, delivering, and receiving the timber. As an example of what is a typical case in the industry, these individuals will include a timber owner, forester, logger, crew chief, truck driver, and Scale House Operator. Each of these individuals' responsibilities are unique and specific. The timber owner, or his agent, is the person who owns the rights to timber on a particular tract of land. The forester is the person who will negotiate a contract for the terms of sale of timber with a logger. The logger will assign the task of cutting a tract of timber to a particular crew chief. The crew chief will be responsible, at the site of the timber, for its cutting and loading onto a vehicle, and for its delivery to a particular destination by a driver. The Scale House Operator is employed at the destination, usually by the entity purchasing the timber. The Scale House Operator is typically responsible for accepting delivery of a load of timber from the driver, and for accounting for the load with respect to load size, timber type, seller, date and time, and other information.

When the timber owner enters his information into the system, the information may not be altered by the forester, logger, crew chief, or Scale House Operator. Additionally, the timber owner's name is embedded into the software and cannot be changed by anyone. The key intent of the system is:

(1) To take responsibility away from lower level personnel, (logger, crew chief, truck driver, and or Scale House Operator.)

(2) To give responsibility of identification to the owner, and forester.

The invention involves the use of a reliable memory device, the Trakker Box, shown in FIG. 1, which is attached to each timber trailer on the left side, forward of the second bolster of the trailer, as depicted in FIG. 2. The Trakker Box transfers all of the pertinent information concerning the harvest of any given tract of timber from the forest to the mill via interface devices known as the Trakker Loader Wand and the Trakker Scale House Wand, both of which are depicted in FIG. 3.

Located within the Trakker Box is a Touch Memory button, model #DS1993, manufactured and distributed by Dallas Semiconductor, of Dallas, Tex. The DS1993 is a reprogrammable, user-available, 4K RAM memory which can be read and written to, and dynamically updated. Data can be transferred to and from the DS1993. Each DS1993 contains a unique, unalterable, 48-bit serial number for absolute traceability. The DS1993 can be read and written to by a computer with a momentary contact. In the disclosed embodiment of the invention, the DS1993 is found within the Trakker Box, and the data transfer to and from the DS1993 is made through direct contact of the wands with the protruding metal sides of the Trakker Box. Upon contact, the data in the DS1993 is read by the computer housed in the wand, and the data is written from the wand to the DS1993 in the Trakker Box.

As shown in FIG. 4, information can be transferred to and from the Box and Wand through the two stainless steel wedges of the Trakker Box and to three tiny circuit boards which then transmit the information to the DS1993 which holds the information. The operation of the Wands, Box, and the manner in which data is transferred to and from each, is further discussed herein.

Loader Wand

The Forester creates a data file referred to as a Logger record. This information is programmed into the Loader Wand. When a load of timber is loaded onto a trailer, the Logger record is transferred to the Trakker Box.

Data is read from the Trakker Box by the Tree Trakker Loader Wand and is stored in the Loader Wand. When the process is in a condition wherein the trailer and Trakker Box has returned to the harvest site from the destination (usually a mill), this data transferred from the Box to the Loader Wand is called a Mill record and is stored for retrieval at a later time. The Loader Wand then builds a new data message called a Logger record. This data is stored on the Loader Wand as well as being written to the Trakker Box. The Loader Wand is connected to a PC at a later time in order to download Mill and Logger records into a PC database.

Scale House Wand

Data is read from the Trakker Box by the Scale House Wand. The Scale House Wand transfers the data to the attached PC. The PC stores this data (a Logger record) in a PC database. The PC then builds a new data message called a Mill record. This data is stored in a PC database and then written to the attached Scale House Wand. The Scale House Wand then writes the data to the Trakker Box.

Data storage

The data in the Loader Wand and Scale House Wand is stored in electronic ram with battery backup so data is not lost in the event of power loss. The Trakker Box uses the Dallas Semiconductor 1993 Touch Memory device for data storage. The 1993 Touch Memory device uses electronic ram with battery backup for data storage.

Data transfer

Information is passed between the Trakker Box and Loader Wand and between the Trakker Box and the Scale House Wand using Dallas Semiconductor's One Wire Protocol. This protocol uses a two wire connection (a data contact and a common ground) to transfer data. Information is passed between the Loader Wand and PC and between the Scale House Wand and PC using an RS-232 interface with a software protocol.

What makes this system simple to use is the fact that the logger in the field and the Scale House Operator at the mill simply touch the Trakker Box with their respective wands to establish an informational data trail for each load of timber (FIG. 4).

Computer Software Module Descriptions

The Personal Computer software modules are all designed to operate on standard 486 personal computers running Microsoft Windows 3.1. These modules include the Timber Owner Module, the Scale House Module, the Forester Module and the Logger Module.

Timber Owner Module

The Timber Owner Module has two primary functions and one secondary function. The first primary function is the creation of Jobs. Jobs are created when the owner enters a Contract Number, Land Owner Identifier (ID), Timber Owner ID, Forester ID, and Tract ID. This information is then "grouped" together to create a Job. Several Jobs for several different Foresters (or the same Forester) may be created at one time. Once these "Jobs" are, created the second Primary function of the Timber Owner Software is to download this information to the Forester via a floppy disk, via modem, or via any other suitable communication means. The secondary function of the Timber Owner Module is to accept Logger Data from multiple loggers and compile the information for each contract.

Forester Module

The Forester Module has one primary function and one secondary function. The primary function of the forester module is to accept the Job Data from the Timber Owner Module, and select a Job. The Forester then negotiates a harvesting arrangement with a Logger. Once this arrangement is decided, the Forester adds the Logger's ID and a Logger Crew ID to the Job data. The Forester Module then programs the Job Data comprised of the Contract Number, Land Owner ID, Timber Owner ID, Forester ID, Tract ID, Logger ID, Logger Crew ID into the Loader Wand via a serial cable connected to the serial port of the P.C. The secondary function of the Forester Module is one of security. The security functions of the Forester Module gives the Forester the ability to read the current information resident on any Trakker Box and the ability to review the information stored in a given Loader Wand.

Scale House Module

The primary function of the Scale House Module is to read data contained in a Trakker Box when it arrives at the mill destination, and to write information to the Trakker Box before it goes back to the harvest site. The information read from the Trakker Box is transmitted to a personal computer in the Scale House via the Scale House Wand which is connected to the PC via a cable. The computer will maintain a data base concerning the arriving loads of timber, and will create reports concerning the loads of timber. This is accomplished through the following steps: (1) A truck pulls up to the mill acceptance point. (2) The Scale House Operator identifies the product on the truck. (3) The Scale House Operator configures his PC for acceptance of this product. (4) The truck driver then touches the Scale House Wand to the Trakker Box attached to his trailer. When this touch occurs, information is exchanged. All of the information placed on the Trakker Box when the Crew Chief touched the Loader Wand to the Trakker Box when the trailer was loaded (i.e., the loader code, sequence number, Contract Number, Land Owner ID, Timber Owner ID, Forester ID, Tract ID, Logger ID, Logger Crew ID, and Logger Time and Date), plus the Trakker Box ID, is downloaded into the PC. First the Loader Code is analyzed. If the Loader Code is correct, the load is accepted and the Scale House Module retransmits the following Scale House Data: a Scale House Code, a sequence number, Contract Number, Timber Owner ID, Scale House ID, Load Net Weight (optional), Product Type, and Scale House Time and Date. If the Loader Code is not correct, the Scale House Module brings up a security violation dialog box which allows the Scale House Operator to decide to accept or reject the load. If the load is accepted, the aforementioned Scale House data is transmitted to the Scale House Wand. The wand then writes this information to the Trakker Box. All of this information becomes a record in the Scale House Module (in the PC) as an accepted load of wood, and if the load had a security violation, a list of security violations is also maintained. This module allows the user to set up the product types from a master list, and to lock out a contract if the contract expires or all the wood under that contract has been accepted (Quota). The user is able to sort, review, print, and export this information via a variety of different formats. These formats provide Timber Owner Reports, total weights, and loads to date, as well as totals for loggers, tracts, foresters, etc.

Logger Module

The Logger Module has two primary functions. The first function is to take the Loader Wand and download all of the information from the wand into the PC, match scale records with loader records and compile that information into reports which identify the incomplete records and security violation records. The second Primary Function is the Logger Module's ability to provide the information from these reports to the Timber Owner via electronic media, and to print and export these reports for analysis of this information by the Logger.

Step-By-Step Description of the Process (with reference to FIG. 5)

Step A. A tract of timber is identified for harvest. The Timber Owner enters specific information into the Timber Owner's Module on his personal computer. He enters such information as the contract number associated with the timber purchase, the land owner's name, the Foresters who oversee the harvest, and a tract identifier. The Timber Owner then groups this information together to form a "Job". The Timber Owner then copies all jobs for each Forester to a diskette for each Forester and gives a disk to each Forester. The Jobs may also be transferred to the Foresters via modem, e-mail, or other communication means. The Forester cannot change the information, passed by the Timber Owner.

Step B. The Forester then negotiates a deal with a Logger to cut the trees. Once this deal is established, and the Logger is ready to cut the timber, the Forester then accesses the Tree Trakker Forester Module in order to add information to the "Job" received earlier from the Timber owner. The Forester adds the Logger's name and Crew Identifier. The Forester is now able to program a Loader Wand for each crew. The Forester then programs the Loader Wand which will contain all the Job data from the Timber owner and the Forester. The Crew Chief is not able to alter this information.

Step C. The Forester then gives each Crew Chief the Loader Wand for his use that day. Once the crews are in the field, trailers are loaded with trees to be taken to the mill. Now, all the Crew Chief must do is touch each Trakker Box with his Loader Wand before the trailer leaves the forest. Once each truck is loaded and ready to carry a load to the mill, the crew chief will touch the trailer's Trakker Box with his Loader Wand, which will automatically result in the entering of the following information onto the DS1993 within the Trakker Box: the Owner Identifier, Forester Identifier, Logger Identifier, Crew Identifier, the Timber Contract Number, the Tract Number and a Departure Time and Date Stamp. The truck is now ready to depart for the mill. Anytime after the Trakker Box is touched, the Forester can check the contents of the Trakker Box to ensure that the correct information has been programmed into the Trakker Box.

Step D. When the truck arrives at the mill, the Scale House Operator enters the wood type into his computer and the Trakker Box is touched with the Scale House Wand. This touch provides the Scale House Operator the following information about the trailer load of trees: the Owner Identifier, Forester Identifier, Logger Identifier, Crew Identifier, the Timber Contract Number, the Tract Number, and Departure Time and Date Stamp. An Arrival Time and Date Stamp are then posted along with this information by his computer, and stored for later use by the Mill. During the Trakker Box read, the Scale House Wand rewrites the Trakker Box with the following information: a Mill Identifier, Contract Number, Timber Owner Identifier, Wood Type, and the Arrival Time and Date Stamp. This information comprises a "Mill Record".

Step C (Repeated). Once the trailer is returned to the forest and reloaded, the Trakker Box is re-touched by the crew chief with his Loader Wand. During this touch, the information written to the Trakker Box by the Mill (the Mill Record of Step D) is read into the Loader Wand and stored. Then the information listed in Step C (the Job Record) from this Loader Wand is re-written to the Trakker Box for the next trip to the mill. This loop, from the harvest site to the trailer, trailer to the mill and trailer back to the loader is repeated many times during the day. It should be noted that the same trailer does not have to return to the same crew in this process. The method disclosed will provide a paperless accounting trail.

Step E. At the end of the day (or week, or any other time interval), the Logger collects the Loader Wands from the Crew Chiefs, connects each Loader Want to his computer, and reads the stored activities from each Loader Wand. Once all of the wands have been read, the files are reconciled by matching Trakker Box Numbers. This provides the Logger with a report which shows when each load of timber left each harvest site, the particular tract, when it reached the mill, the particular mill, and all other pertinent information needed to render a full accounting for the crew's work during the time interval. Each day this activity is added to the previous day's activity until the completion of the accounting period when a new file should be started.

Step F. The mill will also print out a list of the day's activities compiled from the Scale House Operator's data base which has been compiled from each read of the Trakker Boxes by the Scale House Wand. At the end of the accounting period a reconciliation report will be generated. This report will identify all loads carried to the mill for the individual Timber Owner by contract number. At the end of the accounting period, the mill will provide the Timber Owner with a printout of this reconciliation report which will identify all trailer loads delivered to the mill, giving the owner the ability to reconcile his records from the Logger's reports against the mills records.

Step G. The Logger may also send the report (showing when loads leave the woods and when trailers reach the mill) to the timber owner. This optional step allows for an additional point of reference the Timber Owner may use for record verification.

Summary of Process

The Tree Trakker System allows the specific parties involved in the purchase and harvest of timber to enter the Timber Owner Identifier, Forester Identifier, Logger Identifier, Crew Identifier, the Timber Contract Number, and the Tract Number (i.e., social security number, company identifier, timber contract number, and land parcel identifier) information into the system. By having all of the parties involved from the timber purchase to the timber harvest enter specific information into the system, the process is able to provide accountability.

We claim:

1. A method for tracking timber incorporating the use of a mounted memory device, a first hand-held memory device, and a second hand-held memory device, said method comprising the following steps:

a. identifying a tract of timber to be harvested;

b. creating a first set of data related to said tract of timber;

c. copying the first set of data to the first hand-held memory device;

d. adding supplemental data to the first hand-held memory device for the creation thereby of a second set of data for storage in the first hand-held memory device, said second set of data containing said first set of data and said supplemental data, and wherein creating the second set of data includes creating a second set of data having fields for identifying the person responsible for cutting the timber and for loading it onto the vehicle;

e. providing the first hand held device to a person;

f. cutting the tract of timber;

g. loading the cut timber onto a vehicle, said vehicle having attached to it said mounted memory device;

h. copying said second set of data from the first hand-held memory device to the mounted memory device by touching the first hand-held memory device to the mounted memory device;

i. transporting the vehicle to a destination;

j. copying the second set of data from the mounted memory device to the second hand-held memory device by touching the second hand-held memory device to the mounted memory device;

k. adding supplemental data to the second hand-held memory device for the creation thereby of a third set of data for storage in the second hand-held memory device; and l. transforming a third set of data from the second hand-held memory device to the mounted memory device by touching the second hand-held memory device to the mounted memory device.

2. The method of claim 1, wherein creating the first set of data includes creating a first set of data having fields for identifying the tract of timber, the owner of the timber, and the details of a particular contract authorizing the cutting of timber on the tract.

3. The method of claim 1, wherein creating the third set of data includes creating a third set of data having fields for identifying the particular destination chosen, the time and date of arrival of the vehicle at the destination, the weight of the timber arriving at the destination, and the type of timber arriving.

4. The method of claim 1, wherein copying the first set of data to the first hand-held memory device comprises copying the first set of data to a computer.

5. The method of claim 1, wherein copying the second set of data to the second hand-held memory device comprises copying the second set of data to a computer.

6. The method of claim 1, wherein copying the second set of data to the mountable memory device comprises copying the second set of data to a reprogrammable, RAM memory.

7. A method of tracking timber comprising the steps of:

(a) creating a job record;

(b) populating the job record wherein populating the job record comprises populating a job record having fields for a contract number, a timber owner identifier, a forester identifier, a tract number, a logger identifier, and at least one logging crew identifier;

(c) selecting at least one logging crew to harvest the timber;

(d) providing a separate loader wand to each selected logging crew;

(e) transferring the job record to each separate loader wand;

(f) harvesting the timber;

(g) providing a trailer equipped with a random access memory (RAM) device;

(h) loading the trailer with timber;

(i) transferring the job record from the loader wand to the RAM device by touching the loader wand to the RAM device;

(j) generating a departure time and date stamp;

(k) transferring the departure time and date stamp to the RAM device;

(l) towing the trailer to a scale house;

(m) providing a scale house wand;

(n) transferring the job record and the departure time and date stamp from the RAM device to the scale house wand by touching the scale house wand to the RAM device;

(o) generating an arrival time and date stamp;

(p) transferring the job record, the departure time and date stamp, and the arrival time and date stamp to a scale house computer;

(q) identifying the type of wood loaded upon the trailer;

(r) creating a mill record;

(s) populating the mill record;

(t) transferring the mill record to the RAM device;

(u) unloading the trailer;

(v) returning the tailer to the timber tract;

(w) transferring the mill record from the RAM device to the loader wand by touching the loader wand to the RAM device;

(x) repeating steps (h) through (w) for each round trip made by the trailer from the timber tract to the mill and back to the timber tract;

(y) collecting each of the separate loader wands from each of the crew chiefs;

(z) transferring the job records and mill records from each loader wand to a central computer; and (aa) compiling a report on the central computer based on the job records and mill records.

8. The method of claim 7, wherein creating a job record comprises creating a job record having fields for a contract number, a timber owner identifier, a forester identifier, a tract number, a logger identifier, at least one crew identifier, and a departure time-and-date stamp.

9. The method of claim 7, wherein creating a mill record comprises creating a mill record having fields for a scale house identifier, a contract number, a timber owner identifier, a wood type, a net wood weight, and an arrival time and date stamp.

10. The method of claim 7, wherein populating the mill record comprises populating a mill record having fields for a scale house identifier, a contract number, a timber owner identifier, a wood type, a net wood weight, and an arrival time and date stamp.

11. A method of tracking timber comprising the steps of:

(a) creating a job record containing fields for a contract number, a timber owner identifier, a forester identifier, a tract number, a logger identifier, at least one crew identifier, and a time and date stamp;

(b) populating the contract number, timber owner identifier, forester identifier, tract number, logger identifier, and logging crew identifier fields of the job record;

(c) providing a separate loader wand to the chief of each selected logging crew;

(d) transferring the job record to each separate loader wand;

(e) harvesting the timber;

(f) providing a frailer quipped with a random access memory device;

(g) loading the trailer with timber;

(h) transferring the job record from the loader wand to the RAM device by touching the loader wand to the RAM device;

(i) generating a departure time and date stamp;

(j) transferring the departure time and date stamp to the RAM device;
(k) towing the trailer to a scale house;
(l) providing a scale house wand;
(m) transferring the job record and the departure time and date stamp from the RAM device to the scale house wand by touching the scale house wand to the RAM device;
(n) generating an arrival time and date stamp;
(o) transferring the job record, the departure time and date stamp, and the arrival time and date stamp to a scale house computer;
(p) identifying the type of wood loaded upon the trailer;
(q) creating a mill record having fields for a scale house identifier, a contract number, a timber owner identifier, a wood type, and an arrival time and date stamp;
(r) populating the mill record with the scale house identifier, the contract number, the timber owner identifier, the wood type, and the arrival time and date stamp;
(s) transferring the mill record to the scale house wand;
(t) transferring the mill record from the scale house wand to the RAM device by touching the scale house wand to the RAM device;
(u) unloading the trailer;
(v) retiring the trailer to the timber tract;
(w) transferring the mill record from the RAM device to the loader wand;
(x) :repeating steps (g) through (w) for each round trip made by the trailer from the timber tract to the mill and back to the timber fact;
(y) collecting each of the separate loader wands from each of the crew chiefs;
(z) transferring the job records and mill records from each loader wand to a central computer; and
(aa) compiling a report on the central computer based on the job records and mill records.

* * * * *